Figure 1:
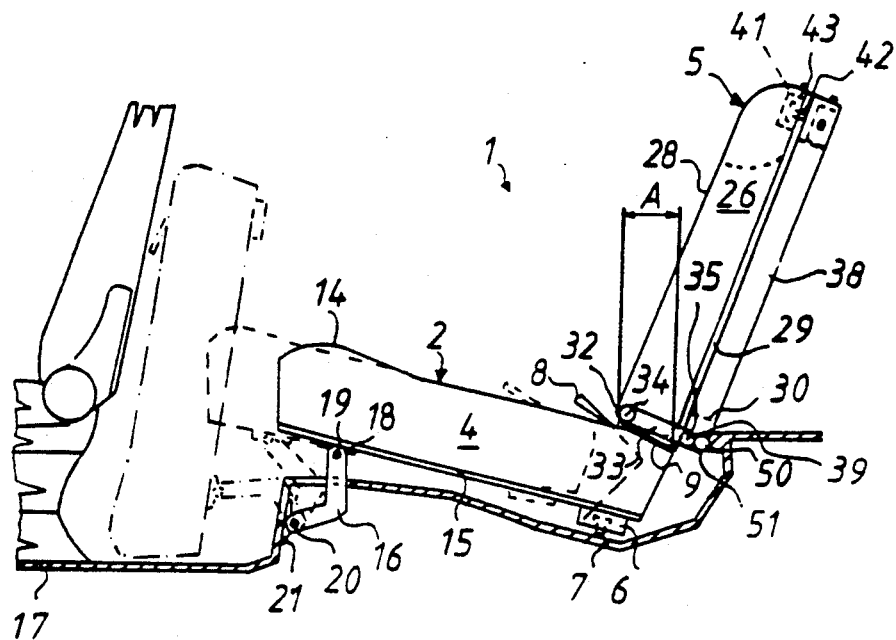

United States Patent [19]

Pärsson

[11] Patent Number: 5,044,683
[45] Date of Patent: Sep. 3, 1991

[54] PASSENGER SEAT ARRANGEMENT IN VEHICLES HAVING A RELEASABLE BACK-CUSHION SUPPORT FRAME

[76] Inventor: Owe Pärsson, Liljevägen 2, S-461 44 Trollhättan, Sweden

[21] Appl. No.: 626,473

[22] Filed: Dec. 12, 1990

[30] Foreign Application Priority Data

Dec. 12, 1989 [SE] Sweden ................................ 8904183

[51] Int. Cl.$^5$ ............................................. B60N 2/36
[52] U.S. Cl. ................................. 296/65.1; 296/68.1; 296/69; 297/379; 280/807; 280/808
[58] Field of Search ................... 296/65.1, 66, 68.1, 296/69; 297/379; 280/808, 807

[56] References Cited

U.S. PATENT DOCUMENTS

| | | | |
|---|---|---|---|
| 2,465,770 | 3/1949 | Volsk | 296/65.1 X |
| 3,909,041 | 9/1975 | Murakami et al. | 280/808 |
| 4,191,399 | 3/1980 | Garvey et al. | 296/68.1 X |
| 4,475,763 | 10/1984 | Hamatani et al. | 296/69 X |
| 4,512,604 | 4/1985 | Maeda et al. | 296/68.1 |
| 4,512,609 | 4/1985 | Parsson | 296/65.1 X |
| 4,572,569 | 2/1986 | Hassmann | 296/65.1 |
| 4,636,005 | 1/1987 | Bolz et al. | 296/65.1 X |
| 4,779,917 | 10/1988 | Campbell et al. | 296/69 X |
| 4,880,264 | 11/1989 | Yamazaki et al. | 296/65.1 X |
| 4,940,266 | 7/1990 | Sakamoto et al. | 297/379 X |

Primary Examiner—Johnny D. Cherry
Assistant Examiner—Gary C. Hoge

[57] ABSTRACT

A rear seat (1) in a passenger car comprises folding back-cushions (25, 26). Behind the back-cushions (25, 26) is a frame (38) arranged to support the back-cushions (25, 26) in the normal back inclination position, in order to constitute a safety-belt fixing point and in order to constitute load-shifting protection against any loads in the baggage space of the car which might slide. The back-cushions (25, 26) are pivotably mounted on the frame (38) and the frame (38) is pivotably mounted on the body floor (7). The back-cushions (25,26) are thus pivotable from back inclination position into loading position either independently of the frame (38) or together with the frame (38).

21 Claims, 3 Drawing Sheets

PASSENGER SEAT ARRANGEMENT IN VEHICLES HAVING A RELEASABLE BACK-CUSHION SUPPORT FRAME

The present invention relates to a passenger seat arrangement in vehicles, especially a rear seat in a passenger car, comprising at least two individually folding back-cushions which, via at least one first bearing, are each pivotable between the normal back inclination position and an essentially horizontal loading position.

In order to make it possible simultaneously to transport rear-seat passengers and long articles such as, for example, skis inside a vehicle, it is known to use a rear seat, the back-rest, and sometimes also the seat cushion, of which consists of two or more individually folding cushions. This is particularly common in passenger cars of the estate or semi-estate type, which do not have a parcel shelf fixed to the body.

When a rear-seat passenger and a long article are to be transported simultaneously in such vehicles, one back-cushion is folded from the normal back inclination position into an essentially horizontal loading position while the other back-cushions remain in the normal back inclination position and constitute together with the seat cushion the seating for the passengers. It is also possible simultaneously to pivot all back-cushions from the normal back inclination position into the horizontal loading position in order thus to obtain a large loading space in the vehicle. Known solutions of the type in question have on the whole three disadvantages.

Firstly, the back-rest is felt to be unstable both when all back-cushions are in the normal back inclination position and when one back-cushion is in the back inclination position while the others are in the horizontal loading position. The reason for this is that the back-cushions in the back inclination position do not rest against any support in the vicinity of the dividing line between the back-cushions but are only detachably fixed on each body side of the vehicle.

The reason why no support is used is that such a support is deemed to limit available loading space in the vehicle, in particular when all back-cushions are pivoted down. In certain models of car, there is indeed a parcel shelf behind the rear seat. This of course provides a certain support but is often collapsible or removable in order to make is possible to increase the loading space of the vehicle and therefore does not solve the instability problem in full.

Secondly, it is not possible to mount a safety belt of the three-point type in the central passenger place of the rear seat since the upper fastening point of such a safety belt limits the loading space in the same way as a support at the partition of the back-cushions.

For this reason, in vehicles with a folding back-rest, only a safety belt of the two-point type is used in the central passenger place. This safety belt, which is only fixed to the floor of the vehicle, is inferior to safety belts of the three-point type from the point of view of safety.

Thirdly, stable shifting protection for loads which might slide in the baggage space is lacking in vehicles with a folding back-rest. Existing load-shifting protection is usually constituted only by the rear side of the back-cushions. These are often not sufficiently strong in order to withstand the powerful stresses which loads which might slide can exert against the rear side of the back-rest in the event of very rapid braking, collisions or other near-accidents.

The aim of the present invention is to eliminate the above-mentioned disadvantages. To this end, the invention is characterized in that the passenger seat comprises a frame which is arranged behind the back-cushion and against which the back-cushion rests lockably in the normal back inclination position for the back-cushion and on which the first articulation is arranged, in that the frame is pivotable, via at least one second articulation which is connected rigidly to the body of the vehicle, between the normal back inclination position for the back-cushion and an essentially horizontal loading position, and in that the back-cushion is pivotable, via the first articulation, from the back inclination position into the loading position-independently of the frame but, via the second articulation, from the back inclination position into the loading position together with the frame.

The arrangement according to the invention eliminates the disadvantages criticized in vehicles which do not have a parcel shelf fixed to the body. The frame constitutes sound support for the back-cushions when these are in the normal back inclination position. Since the frame is moreover pivotable from the back inclination position into a horizontal loading position, the loading space is not limited when all back-cushions are in the loading position.

The frame also makes it possible that a safety belt of the three-point type can be mounted on the central passenger place in the rear seat since it is possible to fix the upper fastening point of the safety belt on the frame. This is a great advantage from the point of view of safety.

Moreover, when the frame is in the normal back inclination position, it functions as a stable shifting protection for loads which might slide in the loading space.

In an advantageous embodiment, the frame comprises an upper and a lower horizontal frame member which extend in the transverse direction of the vehicle and are connected to one another with a number of vertical frame members which delimit open sections in the frame.

On account of this design of the frame, it is possible to pivot one back-cushion from the back inclination position into the loading position, while another back-cushion remains in the back inclination position, with maintained stability of the back-cushion in the back inclination position and with maintained load-shifting protection. The long load in the loading space has the possibility of extending through at least one of the open sections in the frame.

In a further advantageous embodiment, the upper frame member is designed with long forward-facing openings, through each of which a belt strap extends, which is connected to a belt reel which is arranged in a cavity in the frame. By arranging the belt reels in general, but the belt reel for the central passenger place in particular, in a cavity in the frame, they are well protected against blows and impacts caused by loads which might slide in the loading space.

Figure 2:
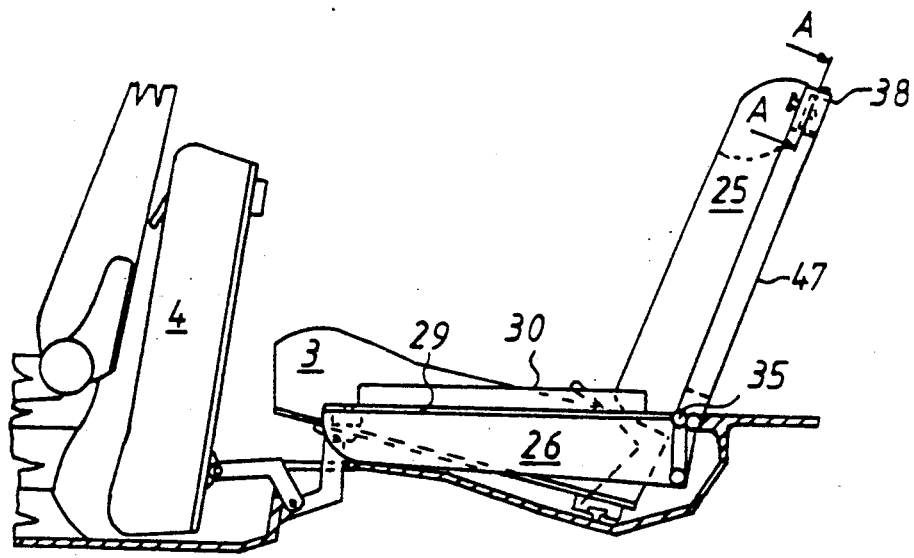
Figure 3:
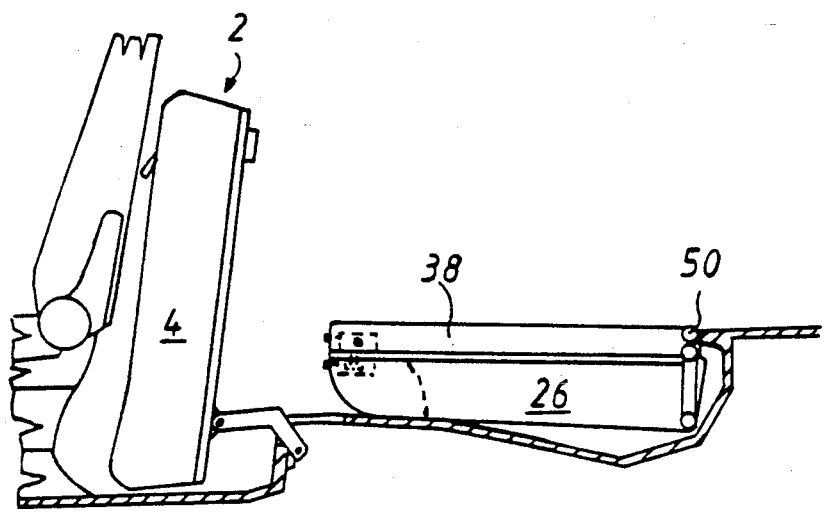
Figure 4:
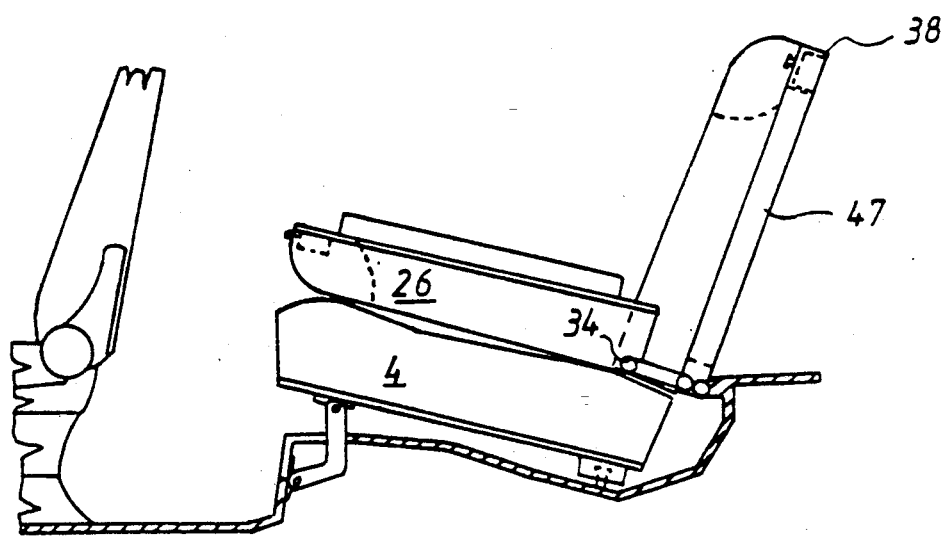
Figure 5:
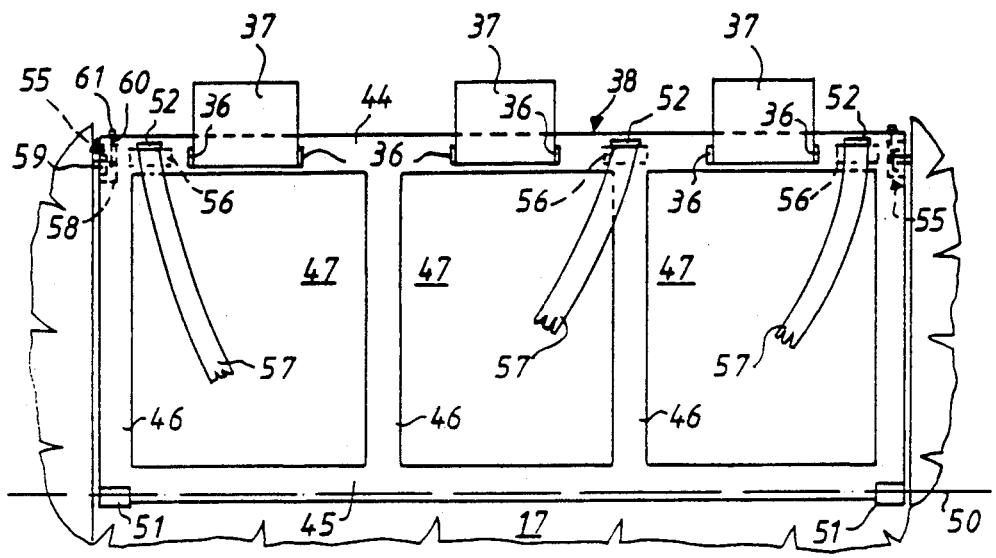
Figure 6:
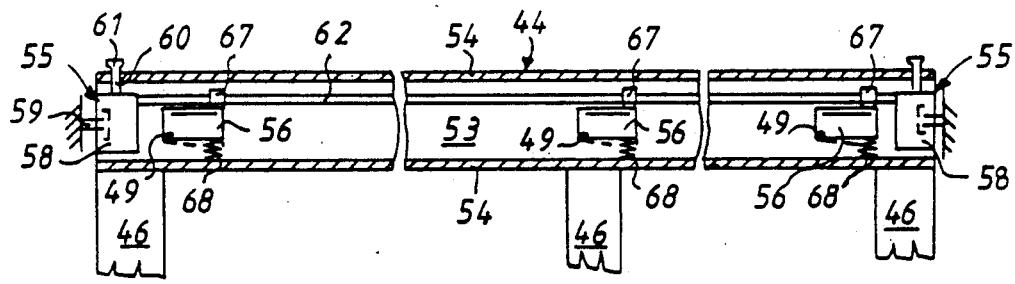

Other features which are characteristic of the invention are indicated in the following patent claims and the description below of an exemplary embodiment of the invention. The description is given with reference to the attached figures, in which:

FIG. 1 shows a side view of a rear seat according to the invention with the back-rest in the normal sitting position, FIG. 2 shows a side view of a rear seat according to the invention with one back-rest part in the normal sitting position and one back-rest part in a first loading position, FIG. 3 shows a side view of a rear seat according to the invention with the back-rest in the loading position, FIG. 4 shows a side view of a rear seat according to the invention with one back-rest part in the normal sitting position and one back-rest part in a second loading position, FIG. 5 shows a support frame which forms part of a rear seat according to the invention, and FIG. 6 shows a cross-section according to A—A in FIG. 2 of an upper frame member which forms part of the support frame.

In FIG. 1, a rear seat 1 in a passenger car which does not have a parcel shelf fixed to the body is shown. The rear seat 1 consists of a seat 2 and a back-rest 5. The seat 2 comprises two adjustable cushion parts 3, 4, the length of the one cushion part 3 constituting 60% approximately of the total length of the seat 2 and the length of the other cushion part 4 constituting the remaining 40% approximately of the total seat length. In FIG. 1, only one cushion part 4 is shown, while both the cushion parts 3, 4 are shown in FIG. 2.

Each cushion part 3, 4 is individually adjustable into three alternative positions, namely into a normal sitting position, a forward tipping position and a vertical loading position. In FIG. 1, the one cushion part 4 is shown with solid outlines in the sitting position, with broken lines in the tipping position, and with dot-dash lines in the loading position. In FIG. 2, the one cushion part 4 is shown with solid outlines in the loading position and the other cushion part 3 in the sitting position.

In the normal sitting position, each cushion part 3, 4 is locked to the vehicle body with locking elements 6, of which only one is shown in FIG. 1. The locking elements 6 interact with a locking bolt 7 which is fixed to the vehicle body. The locking element 6 is freed from the locking bolt 7 by means of manual pulling of a strap 8 which is connected to the locking element 6 via a flexible band. The strap 8 is accessible in a groove 9 between the seat 2 and the back-rest 5. Locking elements for the safety belts of the rear-seat passengers also project in the groove 9.

These locking elements are, however, not shown in the figure. The groove 9 is the common contact line between the seat 2 and the back-rest 5 when the rear seat 1 is in the normal sitting position. The rear end of the seat parts 3, 4 is thus inserted a distance A under the lower edge of the back-rest 5.

Each cushion part 3, 4 consists of a soft cushion 14 which is fixed in conventional manner to a cushion base 15. The front part of each cushion base 15 is connected in an articulated manner to the floor part 17 of the vehicle body via a link arm 16. A bearing 18, in which one end of the link arm 16 is rotatably mounted about a horizontal axis 19, is in this connection fixed to the underside of the cushion base 15. At the other end, the link arm 16 is rotatably mounted about a horizontal axis 20 in a bearing 21 arranged in the floor part 17.

The back-rest 5 also comprises two individually adjustable cushion parts 25, 26. The lengths of the cushion parts 25, 26 correspond in this connection to the lengths of the seat cushion parts 3, 4. In FIG. 1, only one cushion part 26 is shown, while both cushion parts 25, 26 are shown in FIG. 2. Each cushion part 25, 26 is individually adjustable into two alternative positions, namely a normal back inclination position and an essentially horizontal loading position. In FIG. 1, one cushion part 26 is shown in the sitting position and, in FIG. 2, one cushion part 26 is shown in the loading position and the other cushion part 25 in the sitting position.

Each cushion part 25, 26 comprises a soft cushion 28 and a cushion base 29. The cushion base 29 is designed with a raised section 30 which, when the respective cushion part 29, 30 is in the back inclination position, slides into and completely fills an open section 47 in a support frame 38 which is described below. Since the raised section 30 fills the entire open section 47, a completely flat rear side is obtained on the back-rest 5 when the cushion parts 25, 26 are in the back inclination position or when the entire back-rest 5 is in the loading position. On the lower edge, each cushion part 25, 26 is designed with a bearing 32, in which one end of a link arm 33 is rotatably mounted about a horizontal axis 34. At the other end, the link arm 33 is rotatably mounted about a horizontal axis 35 in a bearing 39 arranged in a frame, which will from now on be called a support frame 38.

In the normal back inclination position, each cushion part 25, 26 is locked to the support frame 38 with locking elements 41. Each locking element 41, which is arranged on the upper part of the cushion parts 25, 26, interacts with a forwardly projecting locking bolt 42 which is fixed to the support frame 38. The locking element 41 is released from the locking bolt 42 by means of manual operation of an operating element 43 which is connected to the locking element 41 in a manner which is not shown.

As can be seen from FIG. 5, the support frame 38 comprises an upper and a lower horizontal frame member 44, 45 which extend in the transverse direction of the passenger car and are connected to one another with a number of vertical frame members 46 which delimit open sections 47 in the support frame 38. The lower frame member 45 is rotatably mounted about a horizontal axis 50 in at least one bearing 51 arranged in the floor part 17.

On the upper part of the support frame 38, close to each body side, a locking arrangement 55 is fixed, with the aid of which a rigid connection is brought about between the support frame 38 and the body. The locking arrangement 55, which is shown in FIGS. 5 and 6, is in this connection dimensioned to tolerate powerful stresses, especially of the type which occur in the event of a possible collision with the vehicle.

Close to each body side, the locking arrangement 55 comprises a locking element 58 which interacts with a locking bolt 59 which is fixed to the body of the vehicle. The locking element is freed from the locking bolt 59 by means of manual operation of a bar 60 which is connected to the locking element 58. The end 61 of the bar 60 is accessible for operation by pulling at the upper part of the support frame 38.

The frame members 44–46 of the support frame 38 can consist of members with closed profile, members with open profile or a combination of both these alternatives. In this embodiment, however, the lower frame member 45 and the vertical frame members 46 consist of rectangular tubes while the upper frame member 44 consists of a member with a U-profile, the cavity of which, that is to say the open side, is turned backwards in the longitudinal direction of the vehicle. The upper frame member 44 is furthermore designed with long relatively narrow forward-facing openings 52 which communicate with the space 53 between the flanges 54 of the U-profile.

In the space 53 between the flanges 54, in the vicinity of each long opening 52, a belt reel 56 is arranged, which forms part of a safety belt in the passenger vehicle. A belt 57, which is fixed to the belt reel 56, extends through the opening 52 for fastening to the respective locking element for the safety belts of the rear-seat passengers.

The belt reel 56 is of conventional type and comprises a locking mechanism which reacts to centrifugal force in all directions, high extraction force of the belt 57 and steep inclination of the vehicle in which the belt reel 56 is mounted, in order to lock the belt 57 against extraction from the belt reel 56 when certain conditions exist.

Since the belt reel 56 is mounted in the support frame 38, it is very important for reasons of safety that the support frame 38 is locked properly in relation to the body in the pivoted up position before the rear-seat passengers use the safety belts.

In order to make the rear-seat passengers aware, where appropriate, that the support frame 38 is not locked in relation to the body, each belt reel 56, as shown in FIG. 6, is pivotable in a bearing 49 between an essentially horizontal position and an inclined position in the support frame 38 and connected to the locking arrangement 55 via a long operating element 62 which, depending upon whether the support frame 38 is locked to the body or not, causes the belt reel 56 to assume one or other end position. The operating element 62 is in this exemplary embodiment designed with a cam 67 at each belt reel 56 and rotatably connected, in a manner which is not shown, to the locking elements 58 at its ends. Between each belt reel 56 and the lower flange 54 in the frame member 44, a spring 68 is arranged in order continuously to press the belt reel 56 against the respective cam 67.

In FIG. 6, the belt reel 56 is shown with solid outlines in the horizontal position and with broken outlines in the inclined position.

In this exemplary embodiment, the belt reel 56 is rotatable about a bearing 49 in one of its lower corners. In order to achieve an even safer fastening arrangement of the belt reel 56, it is possible to fix the belt reel 56 in another manner but nevertheless with maintained inclinability.

By inclining the belt reel 56, its locking mechanism reacts as if the vehicle were inclined steeply and therefore locks the belt 57 against extraction from the belt reel 56, as a result of which the rear-seat passengers are made aware that the support frame 38 is not locked in relation to the body. Alternatively, the belt reel 56 can be fixed firmly to the support frame 38 and the operating element can instead be arranged so that it operates directly the locking mechanism in the belt reel 56.

On the upper frame member 44, forward-facing attachments 36 for rotatably arranged neck protectors 37 are fixed. The neck protectors 37 are shown pivoted up in FIG. 5 only. In a further alternative embodiment of an arrangement for making passengers aware of whether the support frame 38 is locked or not, it is possible to arrange the operating element 62 in such a manner that, instead of operating the belt reels 56, it operates the neck protectors 37 so that these put themselves in a position which leads to a very uncomfortable sitting position for the rear-seat passengers if the support frame 38 is not locked in relation to the body.

When rear-seat passengers and a long article are to be transported simultaneously in the passenger car, one seat cushion 4 and the back-cushion 26 corresponding to it are folded, as can be seen in FIG. 2, from the normal sitting position into the loading position.

In practice, the adjustment of the seat cushion 4 from sitting position into loading position is carried out by pulling the strap 8 in FIG. 1 obliquely upwards and forwards with one hand. Thereupon the locking element 6 is freed from the locking bolt 7 and, with continued pulling of the strap, the seat cushion 4 is displaced forwards at the same time as the link arm 16 is rotated in the bearings 18, 21. The displacement movement becomes a tipping movement when the distance A has been covered and the seat cushion 4 assumes an essentially vertical position immediately behind the front seats of the car.

After the adjustment of the seat cushion 4 into the loading position, the locking element 41 of the back-cushion 26 is operated by pressing the operating element 43 downwards. As a result of this, the locking element 41 is freed from the locking bolt 42 and the cushion 26 can be pivoted about its axis 35 into the horizontal loading position which is shown in FIG. 2. The long article can now be placed in the loading space and allowed to extend through one of the open sections 47 in the support frame 38 and on towards the front seat.

Since the support frame 38 remains in the normal back inclination position for the back-cushions 25, 26, it is guaranteed that the back-cushion 25 in the back inclination position receives sound support and is not felt to be unstable. The rear-seat passengers can moreover use a three-point belt and the support frame 38 functions as load-shifting protection for loads which might slide in the loading space.

When a large loading space is desired in the vehicle, both cushion parts 3, 4 of the seat are folded, in the manner described above, into the vertical position immediately behind the front seats. Subsequently, as can be seen from FIG. 3, the support frame 38 and also the cushion parts 25, 26, which are locked to the support frame 38, are folded from the normal back inclination position into an essentially horizontal loading position.

In practice, the adjustment of the support frame 38 from back inclination position into loading position is carried out, as is shown in FIGS. 5 and 6, by pulling the end 61 of the bar 60 upwards with one hand, as a result of which the locking element 58 is freed from the locking bolt 59. When the end 61 of the bar 60 is pulled upwards, the operating element 62, which is rotatably connected to the locking elements 58, is rotated, as a result of which the cams 67 operate the belt reels 56 so that these assume the inclined positions shown with broken outlines in FIG. 6. When each belt reel 56 is inclined, the locking-mechanism is operated in it, as a result of which the belt 57 is locked against extraction. Subsequently, the support frame 38 is rotated about its axis 50 and assumes the essentially horizontal loading position. Since the cushion base 29 of the cushions 25, 26 is in each case designed with a raised section 30 which slides into and completely fills the respective open section 47 in the support frame, a flat floor is obtained in the loading space.

In certain cases, it is desirable to transport both rear-seat passengers and a long article without for this reason folding one of the seat cushions into the loading position. This is achieved by folding one back-cushion, in this exemplary embodiment the cushion 26, on top of corresponding seat cushion 4. This is shown in FIG. 4. The adjustment takes place by pressing the operating element 43 in FIG. 1 downwards and freeing the locking element 41 from the locking bolt 42 in the manner described above. Subsequently, the cushion 26 is pivoted about the axis 34 into the essentially horizontal loading position. The long article can now be placed in the loading space and allowed to extend through one of the open sections 47 in the support frame 38 and on towards the front seat.

The readjustment of the rear seat 1 into its normal position takes place in reverse order, which means that the cushion parts 25, 26 of the back-rest 5 are, where appropriate, automatically locked in relation to the support frame 38 or that the support frame 38, after a large loading space has been used, is automatically locked in relation to the body. When the support frame 38 is locked in relation to the body, the belt reels 56, by operation of the operating element 62, are rotated into the horizontal position, in which position it is possible to pull out the belt 57. The invention is not to be regarded as being limited by the embodiment described but can, within the scope of the following patent claims, be modified in a number of alternative embodiments. In the case of the exemplary embodiment, the belt reels are, for example, arranged in cavities in the frame. The belt reels do not necessarily in this connection need to be arranged in the upper frame member as in the example, but can alternatively be arranged in the vertical frame members. Nor is it necessary to have the belt straps extend through long openings in the frame, but the belt straps can as an alternative be guided at the side of any of the frame members with the aid of any type of belt-strap guide made of, for example, plastic.

I claim:

1. A passenger seat in a vehicle, wherein the seat comprises a seat portion and a folding back cushion pivotable between a normal upright, back inclination position and an essentially horizontal loading position; the back cushion having a front side facing forwardly in the seat when the back is in the upright back position and having an opposite back side;
   a frame behind the back side of the back cushion;
   a first bearing toward the bottom of the back cushion and on the frame which permits the back cushion to pivot selectively with and with respect to the frame between the upright back inclination position and the essentially horizontal loading position;
   a second bearing on the frame and connected to the body of the vehicle, and the frame being pivotable at the second bearing between a generally upright inclination position corresponding to the normal back inclination position of the back cushion and an essentially horizontal loading position, means for locking the back cushion to the frame; the first bearing for the back cushion on the frame enabling the back cushion to be pivoted independently of the frame, and also to be pivoted along with the frame when the back cushion is locked to the frame, between the back inclination position and the horizontal loading position, the second bearing for the frame on the vehicle body enabling the frame to be pivoted from the upright inclination position into the loading position.

2. The seat of claim 1, wherein the first and second bearings are generally at the same height at the frame.

3. The seat of claim 1, wherein the second bearing is at a fixed location on the body of the vehicle.

4. The seat of claim 1, wherein the frame comprises an upper horizontal frame member and a lower horizontal frame member spaced apart from the upper frame member, both of the frame members extending in the transverse direction of the vehicle, and vertical frame members extending between and connecting the upper and lower horizontal frame members, the vertical frame members being spaced apart to define open sections through the frame.

5. The seat of claim 4, wherein the back cushion comprises a cushion base and a raised back section behind the base, the raised section being shaped so that with the back cushion in the normal upright back inclination position, the raised section slides into and substantially completely fills the open section in the frame.

6. The seat of claim 4, further comprising at least one seat belt reel fixed to the frame and a seat belt wound onto the seat belt reel.

7. The seat of claim 6, wherein the upper frame member includes a forwardly facing opening facing over the seat, the belt reel being arranged on the upper frame member and the belt on the belt reel extending through the forwardly facing opening.

8. The seat of claim 7, further comprising a cavity defined in the upper frame member and the forwardly facing opening communicating with the cavity.

9. The seat of claim 1, further comprising at least one seat belt reel fixed to the frame and a seat belt wound onto the seat belt reel.

10. The seat of claim 9, wherein the upper frame member includes a forwardly facing opening facing over the seat, the belt reel being arranged on the upper frame member and the belt on the belt reel extending through the forwardly facing opening.

11. The seat of claim 10, further comprising a cavity defined in the upper frame member and the forwardly facing opening communicating with the cavity.

12. The seat of claim 11, further comprising a locking arrangement for producing a rigid connection between the frame and the vehicle body to prohibit movement of the frame from the upright inclination position while the locking arrangement is engaged.

13. The seat of claim 12, further comprising an operating element connecting the belt reel to the locking arrangement for causing cooperative action by the belt reel upon operation of the locking arrangement.

14. The seat of claim 13, wherein the belt reel includes a locking mechanism for preventing extraction of the belt off the belt reel, and the operating element connected between the belt reel and the locking arrangement of the frame being operative to operate the locking mechanism of the belt reel when the locking arrangement of the frame is disengaged and the frame and the body are not rigidly connected.

15. The seat of claim 14, wherein the locking mechanism of the belt reel is operable to lock the belt reel against extraction of the belt upon inclination of the belt reel beyond a predetermined extent; the operating element being connected with the belt reel for inclining the belt reel when the frame and the vehicle body are not connected for locking the belt against extraction from the reel.

16. The seat of claim 2, further comprising an attachment on the upper frame member for a passenger neck protector.

17. The seat of claim 4, wherein the upper frame member comprises load shifting and sliding protection for any load in a baggage space.

18. The seat of claim 1, further comprising a locking arrangement for producing a rigid connection between the frame and the vehicle body to prohibit movement of the frame from the upright inclination position while the locking arrangement is engaged.

19. The seat of claim 1, wherein there are at least two separate back cushions and each of the back cushions has a respective first bearing for pivot connection with the frame, and the frame is a common frame for all of the back cushions.

20. The seat of claim 1, wherein the seat portion is in front of the back cushion when the back cushion is in the upright back inclination position; and means for moving the seat forward out of the path of pivoting of the back cushion which movement is separate from pivoting of the back cushion and from pivoting of the frame.

21. The seat of claim 20, wherein the first bearing connection between the back cushion and the frame includes means for enabling the back cushion to pivot forward to a horizontal supporting position on the vehicle body when the seat has been moved forward out of the path of the back cushion and also to enable the back cushion to rest atop the seat when the seat has not been moved forward out of the path of the back cushion.

* * * * *